3,335,118
CRUDE RUBBERS, VULCANIZATES AND PROCESS
Gaylord A. Kanavel, Yardley, Pa., and George Rosen, Wayne, N.J., assignors to Thiokol Chemical Corporation, Bristol, Pa., a corporation of Delaware
No Drawing. Filed Dec. 23, 1963, Ser. No. 332,950
22 Claims. (Cl. 260—86.1)

This invention relates to novel curable acrylate polymer based crude rubber vulcanizates and the attendant vulcanizing process. More particularly, this invention relates to the novel curable crude rubber compositions formed by admixture of heat decomposable organic ammonium salts and interpolymers of lower alkyl acrylate esters and olefin-epoxide monomers, and also relates to the vulcanizates obtained by the heat treatment of these novel crude rubbers, and further relates to the attendant vulcanizing process.

Acrylate interpolymers are known in the art which may be cured to form elastomers of good physical properties. However, these prior art interpolymers suffer from one or another disadvantage. Some interpolymers contain chlorine which tends to promote corrosion of the steel molds ordinarily used in the fabrication of the molded end articles. Another disadvantage of many prior art acrylate interpolymers is that they are curable only with amine-type vulcanizing agents. The latter add to the corrosive nature of curable crude rubber compositions formed therewith, and are often toxic.

It is an object of this invention to provide novel curable acrylate polymer based crude rubber compositions from acrylate/oylefin-epoxide interpolymers and heat decomposable organic ammonium salts.

Another object of this invention is to provide novel vulcanizates of said acrylate/olefin-epoxide/ammonium salt crude rubbers which are elastomers with good physical properties.

Other objects of this invention are implicit in or will become apparent from the following explanations and examples.

Unexpectedly, it has been discovered that novel and improved curable acrylate polymer based crude rubber compositions are proivded by the use, as a curing agent, of heat decomposable organic ammonium salts with interpolymers containing a major portion of acrylate monomers formed by interpolymerization of lower alkyl acrylate esters with at least 0.5% by weight of olefin-epoxide monomers. The novel crude rubber compositions thus obtained not only have excellent bin stability but are also relatively nontoxic and noncorrosive. Further, the curable crude rubber compositions of this invention may be used in ordinary steel molds which latter do not have to be specially polished and/or plated to prevent corrosion, as is often required with prior art crude rubber compositions. Upon cure, novel vulcanizates may be produced from the crude rubber compositions of the present invention which are elastomers and which have good physical properties.

In general, the interpolymers useful in the practice of this invention are produced by free radical polymerization of about 60 to 99.5 weight percent of lower alkyl acrylate esters, with up to about 30 weight percent of acrylonitrile, with about 0.5 to 10 weight percent of olefin-epoxide monomers and with up to 1.5 weight percent of polyene monomers. Conventional peroxide, persulfate, or azo type initiators may be used in the interpolymerization process. Benzoyl peroxide and azobisisobutyronitrile are the preferred initiators. The monomers may be polymerized using solution, suspension, emulsion, or bulk polymerization methods. The initiator may be added to the monomers either in a single charge, or in increments, or continuously, to initiate polymerization. Adjuvants commonly used in acrylate polymerization procedures may also be added during the reaction period such as suspending agents, which often prove useful in suspension procedures to facilitate handling or processing the reaction product. The order of addition of monomers, initiators and adjuvants to the reaction system is as is usually employed in the art for the specific polymerization technique chosen. Polymerization is facilitated by heating and agitation and proceeds until the desired solid interpolymers have formed. The preferred method is aqueous suspension polymerization. The interpolymerization may be conducted in about 2 to 5 hours at about 80 to 100° C.

The lower alkyl acrylates which are usefully employed in the present invention are esters of acrylic acid and the lower alkanols. These acrylate esters may be used singly or in combination with one another to make up from about 60 to 99.5 weight percent of the total monomer charge in the interpolymerization process. Of the lower alkanols, both normal and branched chain alcohols may be used, and preferably those which have up to a total of about 8 carbon atoms per molecule. Thus, preferred acrylates formed therefrom and useful herein have either normal or branch-chained alkyl ester groups, and include in their number ethyl acrylate, propyl acrylate, isopropyl acrylate, n-butyl acrylate, isobutyl acrylate, sec.-butyl acrylate, tert.-butyl acrylate, and the isomeric forms of pentyl, hexyl, heptyl and octyl acrylates, and in the latter instance most preferably 2-ethylhexyl acrylate.

Acrylonitrile may be used to replace a portion of the lower alkyl acrylate esters ordinarily employed herein, and in quantities of up to 30 weight percent of the total of monomers charged. Acrylonitrile, where used, has the effect of imparting to the present elastomeric vulcanizates a somewhat greater hardness, higher torsional modulus G10,000 temperature, and increased solvent swell resistance to the action of oils than do vulcanizates produced from otherwise identical interpolymers of this invention containing no acrylonitrile.

The polyene monomers also may be used to replace a portion of the lower alkyl acrylate esters ordinarily employed herein and in quantities of up to 1.5 percent by weight of the total of monomers charged to prepare the present interpolymers. They are monomeric materials containing at least two carbon-to-carbon double bond linkages, and may contain from two to four vinyl and/or allylic unsaturated groups per molecule. Mixed polyene monomers may be used which contain both vinyl and allylic groups. Polyene monomers tend to increase the Mooney viscosity values of interpolymers formed therewith. The present polyenes are distinguished from the broad class of polyolefin monomers in that the reactive unsaturated groups within any one molecule are not in immediate conjugate position with respect to one another, that is to say the reactive groups are separated by at least one atom. The nonconjugated double bonds of the present polyene monomers are separated by some intervening chemical structure which is inert to reaction with epoxide groups, the nature of which may vary widely from say a sulfur, an oxygen, a polymethylene, or a neopentyl group to an aromatic, an alkyl, or an amido group, etc., and for the purposes of this invention not appreciably detract from the novel qualities desired in the present interpolymers formed therewith. Typical polyene monomers are listed in U.S. 2,340,111.

Table I presents representative useful polyene monomers having allylic unsaturation. These are designated hereinafter as allylic polyene monomers.

TABLE I

Diene monomers allyl beta-allyloxypropionate
diallyl ether
allyl diglycol carbonate
allyl glycol ether
diallyl adipate
diallyl azelate
diallyl carbonate
diallyl diglycolate
diallyl isosebacate
diallyl homophthalate
diallyl malonate
diallyl nadic ester
trimethylol propane diallyl ether
diallyl oxalate
diallyl phthalate
diallyl isophthalate
diallyl terephthalate
diallyl sebacate
diallyl suberate
diallyl succinate
diallyl sulfide

Triene monomers trimethylol propane triallyl ether
triallyl aconitate
triallyl citrate
triallyl cyanurate
triallyl phosphate

Tetraene monomer pentaerythritol tetraallyl ether

Table II represents some representative vinyl polyene monomers of the acrylate type which may be usefully employed in the present invention.

TABLE II

Diene monomers acrylic anhydride
ethylene diacrylate
tetramethylene diacrylate
2-butene-1,4-diol diacrylate
ethylene glycol-2,2'-dicyanoacrylate
neopentyl glycol-2,2'-dicyanoacrylate

Triene monomer glyceryl triacrylate

Table III presents some representative vinyl polyene monomers of the methacrylate type which may be usefully employed in the present invention.

TABLE III

Diene monomers

Bisphenol A dimethacrylate
2,4-dimethylhexanediol-2,5-dimethacrylate
ethylene dimethacrylate
methacrylic anhydride
neopentyl glycol dimethacrylate
tetramethylene dimethacrylate
triethylene glycol dimethacrylate
dimethyl propane dimethacrylate
diethylene glycol dimethacrylate
butyne dimethacrylate
cyclohexane dimethanol dimethacrylate
butene dimethacrylate
butane dimethacrylate

Triene monomers glyceryl trimethacrylate
trimethylol propane trimethacrylate
trimethacrylate of isocyanurate

Tetraene monomer pentaerythritol tetramethacrylate

Table IV presents some other representative vinyl polyene monomers which may be usefully employed in the present invention.

TABLE IV

Diene monomers 2,5-dimethylhexadiene-1,5
divinyl benzene
divinyl sulfide
divinyl sulfone
divinyl oxalate
N,N-methylene-bis-acrylamide Table V presents some representative polyene monomers of mixed types, that is those polyenes which contain at least one unsaturated group from at least two of the types found useful herein.

TABLE V

Mixed allylic and vinyl diene monomers allyl acrylate
allyl methacrylate
N-allyl acrylamide
allyl methacrylamide
methallyl acrylate
methallyl methacrylate
vinyl acrylate
vinyl methacrylate
allyl vinyl ether

Mixed allylic and vinyl triene monomers

N,N-diallylacrylamide
N,N-dimethallylacrylamide
diallyl itaconate

The preferred polyene monomers for use herein are allyl methacrylate and allyl acrylate.

The olefin-epoxide monomers useful for preparation of the present interpolymers are substances which contain at least one polymerizable carbon-to-carbon double bond either of a terminal type, viz $CH_2=C<$, and/or of an internal type, viz $>C=C<$; these will hereinafter be termed olefin radicals. The olefin-epoxide monomers also contain at least one epoxide radical, viz

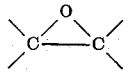

The olefin and epoxide radicals of the monomers may be joined by some intervening chemical structure which is inert to reaction with epoxide groups, the nature of which may vary widely, such as was previously described, and still not appreciably detract for the novel qualities desired in the present interpolymers formed therewith.

Several methods may be used to prepare useful olefin-epoxide monomers. One method is by the partial epoxidation of polyene monomers, such as those which are described in Tables I to V above. By "partial epoxidation" is meant that only some of olefin radicals present in the polyene monomers are epoxidized, leaving intact at least one reactive carbon-to-carbon double bond linkage per molecule. This may be accomplished by use of epoxidation methods commonly known to the arts, such as by the Prileschajew reaction, i.e., epoxidation through the action of an organic peracid, such as perbenzoic, peracetic, perphthalic or performic acids on only some of the olefin radicals in the polyene monomers. Other useful olefin-epoxide monomers include dicyclopentadiene monoepoxide, pyran monoepoxide, 4-vinylcyclohexene monoepoxide, isoprene monoepoxide, butadiene monoepoxide and p-epoxy ethyl styrene. The mixed ethers of polymerizable unsaturated alcohols and epoxy alcohols are useful olefin-epoxide monomers, such as vinyl glycidyl ether, allyl glycidyl ether, methallyl glycidyl ether, the methyl vinyl carbinyl ether of beta phenyl glycidol, the allyl ether of beta methyl glycidol, and others such as are disclosed in U.S. Patent 2,314,039. Useful ester-type olefin-epoxide monomers may be formed by esterification of epoxy alcohols by polymerizable unsaturated acids, such as acrylic, methacrylic, itaconic, fumaric, maleic acids, etc., conversely, epoxy acids such as glycidyl acid may be esterified with polymerizable unsaturated alcohols to form such ester-type olefin-epoxide monomers. Allyl glycidyl ether, glycidyl acrylate and glycidyl methacrylate are the preferred olefin-epoxide monomers.

Olefin-epoxide monomers, either singly or in mixture may be used in quantities of about 0.5 to 10 percent by weight of monomer charge to prepare the present interpolymers. Even such minor quantities as one percent of olefin-epoxide monomers are effective in providing sufficient intact epoxide groups in the interpolymers formed therewith to permit cure by decomposable organic ammonium salts such as are disclosed below.

In the vulcanization process, the acrylate/olefin-epoxide interpolymers are admixed with heat decomposable organic ammonium salts to form the present novel curable crude rubbers. The crude rubbers upon heat treatment, say at from 250 to 450° F. and in cure times of from about 5 minutes to about 72 hours, will provide novel vulcanizates which are elastomers, having good physical properties. The lower curing temperatures usually require the longer curing times. When the curable crude rubbers are heat treated in ordinary steel molds, no substantial corrosion of the molds occurs. The curable crude rubbers have good bin stability, that is to say the crude rubber compositions will not deteriorate or change substantially upon standing for prolonged periods of time prior to heat treatment; further, the compositions are relatively nontoxic.

Decomposable organic ammonium salts may be used to cure the instant interpolymers are the ammonium salts of organic acids which salts will decompose upon heating at or below 450° F., and in their number include ammonium benzoate, ammonium acetate, ammonium citrate, ammonium formate, ammonium gallate, ammonium oxalate, ammonium salicylate, ammonium tartrate, etc. They may be used in quantities of from about 1 to 10 parts by weight per 100 parts by weight of the curable interpolymers to provide cured elastomers.

The preparation and use of the curable acrylate polymer based crude rubber compositions and vulcanizates are illustrated in the following examples. The scope of the invention, however, is not limited merely to the practice as taught by the examples below since many changes in composition, concentrations, and processing conditions other than those presented may be used without departing from the present invention.

*Example 1*

A reaction vessel was charged with 300 parts by weight (p.b.w.) of hot tap water and 5.76 p.b.w. of a 15% by weight aqueous solution of polyacrylic acid, which latter is a suspending aid hereinafter called Alcogum. The Alcogum was uniformly dispersed with agitation, and the resultant mixture was cooled to room temperature. The monomers, 83 p.b.w. of butyl acrylate, 12 p.b.w. of acrylonitrile, 5 p.b.w. of allyl glycidyl ether, an olefin-epoxide, and 0.1 p.b.w. of allyl methacrylate, a mixed polyene, were charged to the aqueous Alcogum dispersion. The temperature of the reaction mixture was elevated to reflux temperatures, at about 87 to 89° C., and maintained thereat with agitation. An initial charge of 0.0035 p.b.w. of azobisisobutyronitrile initiator catalyst in benzene solution was made at the onset of reflux. Five additional charges, 0.0028 p.b.w. each, of initiator catalyst were made at 22 minute intervals thereafter to provide a white solid interpolymer. The polymer product, interpolymer A, was separated from the liquid portions of the pot mixture and dried. Mooney viscosity measurements (ASTM No. D1646–59T, using ML–4 disc and time) were taken on interpolymer A, and gave values of 25 at 212° F., and 14 at 295° F. Interpolymer B was prepared in identical manner to A from 83 p.b.w. of butyl acrylate, 12 p.b.w. of acrylonitrile and 5 p.b.w. of allyl glycidyl ether. It had a Mooney viscosity value of 12 at 212° F. and was too soft to measure at 295° F.

Curable crude rubber compositions were prepared by milling together 100 p.b.w. of each of interpolymers A and B prepared as above with 4 p.b.w. of ammonium benzoate, 2 p.b.w. of stearic acid and 40 p.b.w. of "Philblack A" carbon black. The crude rubbers obtained were then cured in a rubber press at 2000 p.s.i. and 340° F. for 5 minutes, and then post cured in an oven for 5 hours at 350° F. The elastomers A and B produced upon cooling had tensile strengths of 940 p.s.i. and 1,080 p.s.i., elongations at break of 195% and 230% and Shore A hardnesses of 53 and 51 durometer degrees respectively.

*Example 2*

According to the method of Example 1, white, solid interpolymer 2A was formed from 98 p.b.w. of ethyl acrylate, 2 p.b.w. of allyl glycidyl ether and 0.1 p.b.w. of allyl methacrylate. The product gave Mooney viscosity values of 81 at 212° F. and 68 at 295° F. Interpolymer 2B was prepared in identical manner from 98 p.b.w. of ethyl acrylate and 2 p.b.w. of allyl glycidyl ether and had Mooney viscosity values of 54 at 212° F. and 38 at 295° F.

Curable crude rubber compositions were prepared using 100 p.b.w. of each of the interpolymers prepared as above and 4 p.b.w. of ammonium benzoate, 2 p.b.w. of stearic acid and 40 p.b.w. of "Philblack A" carbon black by mixing the components on a rubber mill until a physically uniform mixture was obtained. The curable crude rubber compositions produced thereby were then cured in a rubber press at 2000 p.s.i. and 340° F. for 5 minutes to produce vulcanizates, elastomers 2A and 2B. A portion of elastomers 2A and 2B were not then post cured in an oven for 5 hours at 350° F. to produce the vulcanizates 2A and 2B with properties as listed.

|  | Vulcanizates | |
| --- | --- | --- |
|  | 2A | 2B |
| Tensile strength, in p.s.i. | 1,500 | 1,500 |
| Elongation at break, in percent | 370 | 450 |
| Hardness, in Shore A degrees | 45 | 53 |

An interpolymer formed from 98 p.b.w. of ethyl acrylate and 0.1 p.b.w. of allyl methacrylate will not cure with ammonium benzoate under the curing conditions used above.

*Example 3*

The method of Example 1 was used to form interpolymer 3A from 97 p.b.w. of ethyl acrylate, 3 p.b.w. of allyl glycidyl ether and 0.05 p.b.w. of allyl methacrylate. Mooney viscosity values obtained therewith were 57 at 212° F. and 46 at 295° F. Mooney viscosity values of interpolymer 3B formed in identical manner with 96.5 p.b.w. of ethyl acrylate and 3.5 p.b.w. of allyl glycidyl ether were 48 at 212° F. and 25 at 295° F.

Curable crude rubber compositions 3A and 3B were formed by milling together 100 p.b.w. of the interpolymers prepared as above with 4 p.b.w. of ammonium benzoate, 2 p.b.w. of stearic acid and 40 p.b.w. of "Philblack A" carbon black. The crude rubbers 3A and 3B obtained were cured in a rubber press at 2000 p.s.i. and 340° F. for 5 minutes and then post cured in an oven at 350° F. for 5 hours. The vulcanizates 3A and 3B obtained had tensible strengths of 1470 p.s.i. and 1405 p.s.i., elongations at break of 430% and 195% and Shore A hardnesses of 54 and 55 durometer degrees respectively.

Example 4

The method of Example 1 was used to form interpolymer 4A from 95 p.b.w. of ethyl acrylate, 5 p.b.w. of allyl glycidyl ether and 0.5 p.b.w. of allyl methacrylate. Mooney viscosity values obtained therewith were 64 at 212° F. and 49 at 295° F. Mooney viscosity values of interpolymer 4B formed in identical manner with 95 p.b.w. of ethyl acrylate and 5 p.b.w. of allyl glycidyl ether were 31 at 212° F. and 16 at 295° F.

Curable crude rubber compositions 4A and 4B were formed with interpolymers 4A and 4B prepared in this example, according to the recipe and method of Example 1, and cured to form vulcanizates 4A and 4B, according to the method described in Example 2 to prepare elastomers 2A and 2B respectively. The physical properties obtained are as listed.

|  | Elastomer | |
| --- | --- | --- |
|  | 4A | 4B |
| Tensile strength, in p.s.i. | 1,190 | 1,670 |
| Elongation at break, in percent | 150 | 230 |
| Hardness, in Shore A degrees | 59 | 54 |

Example 5

The method of Example 1 was used to form an interpolymer from 97 p.b.w. of ethyl acrylate, 3 p.b.w. of allyl glycidyl ether and 0.5 p.b.w. of allyl methacrylate. The interpolymer, per 100 p.b.w., was admixed on a rubber mill with 1 p.b.w. of stearic acid, 40 p.b.w. of "Philblack A" carbon black and 4 p.b.w. of ammonium acetate to provide a curable acrylate polymer based crude rubber of this invention. The crude rubber was then cured in a rubber press at 2,000 p.s.i. and 340° F. for 5 minutes and post cured in an oven for 5 hours at 350° F. to produce upon cooling a vulcanizate with a tensile strength of 1452 p.s.i., an elongation of 443% and a hardness of 49 Shore A durometer degrees.

Examples 6 to 11

Curable acrylate polymer based crude rubber compositions of this invention were prepared in similar manner to the method described in Example 5 and according to the recipes listed below. The interpolymer used throughout also was prepared in similar manner to that prepared in Example 5 and was of similar composition. The recipe components are all in parts by weight. The compositions were tested for their ability to cure by the Mooney scorch test (ASTM method D1646-59T); the times that were required for each composition to cause a 4 and also a 10 point rise on the Mooney scale are reported as the ratio of (minutes for a 4 point rise)/(minutes for a 10 point rise). The test is conducted for 30 or more minutes, and values of greater than 30 for a 4 point rise usually indicate no cure, whereas values of less than 30 for a 4 point rise indicate the occurrence of cure. In general, the lower the value obtained for a 4 point rise the faster the cure.

| Example | 6 | 7 | 8 | 9 | 10 | 11 |
| --- | --- | --- | --- | --- | --- | --- |
| Curable Crude Rubber Recipe, in p.b.w.: | | | | | | |
| Interpolymer, as in Example 5 | 100 | 100 | 100 | 100 | 100 | 100 |
| Stearic Acid | 1 | 1 | 1 | 1 | 1 | 1 |
| Philblack A, carbon black | 40 | 40 | 40 | 40 | 40 | 40 |
| Ammonium formate | 1.8 | | | | | |
| Ammonium citrate (dibasic) | | 3.3 | | | | |
| Ammonium oxalate | | | 2.1 | | | |
| Ammonium tartrate | | | | 2.7 | | |
| Ammonium benzoate | | | | | 2.67 | |
| Ammonium acetate | | | | | | 2.67 |
| Curability: | | | | | | |
| Mooney scorch, ASTM D1646-59T, 4 pt./10 pt. rise in min./min., at 350° F | 3/3.5 | 9/10.5 | 27/>30 | 12/15 | 2/2 | 2/3 |

Examples 12 and 13

The method of Example 1 was used to form interpolymer 12 from 94.05 p.b.w. of ethyl acrylate and 5.95 p.b.w. of glycidyl acrylate and also to form interpolymer 13 from 99.4 p.b.w. of ethyl acrylate and 0.6 p.b.w. of glycidyl acrylate. Interpolymers 12 and 13 were each admixed, 100 p.b.w., with 1 p.b.w. of stearic acid, 40 p.b.w. of Philblack A carbon black and 4 p.b.w. of ammonium benzoate on a rubber mill to provide curable acrylate polymer based crude rubbers 12 and 13 of this invention respectively. The crude rubbers were then cured in a rubber press at 2,000 p.s.i. and 340° F. for 10 minutes and post cured in an oven for 5 hours at 350° F. before testing. Physical properties obtained for the vulcanizates 12 and 13 are as listed.

| Example | 12 | 13 |
| --- | --- | --- |
| Interpolymer composition, p.b.w.: | | |
| Ethyl acrylate | 94.05 | 99.4 |
| Glycidyl acrylate | 5.95 | 0.6 |
| Vulcanizate properties: | | |
| Mooney viscosity at 212° F | 83 | 80 |
| Tensile strength, in p.s.i. | 940 | 825 |
| Ultimate elongation, in percent | 70 | 390 |
| Shore A hardness, in durometer degrees | 74 | 51 |

We claim:

1. A curable composition which curable in the presence of a heat treatment comprising at least one rubbery interpolymer and about 1 to 10 parts by weight of at least one heat decomposable ammonium salt of an organic acid per 100 parts by weight of said interpolymer in intimate admixture therewith, said acid being selected from the group consisting of formic, citric, oxalic, tartaric, benzoic and acetic acids, and said interpolymer being formed from a polymerizable monomer charge comprising about 60 to 99.5 weight percent of at least one lower alkyl acrylate ester, up to about 30 weight percent of acrylonitrile and about 0.5 to 10 weight percent of at least one olefin-epoxide monomer which contains in its structure at least polymerizable carbon-to-carbon double bond and at least one epoxide radical.

2. A curable composition as in claim 1 wherein said monomer charge further comprises up to about 1.5 weight percent of at least one polyene monomer which contains in its structure at least two non-conjugated carbon-to-carbon double bond groups selected from the group consisting of vinyl and allylic groups.

3. A curable composition as in claim 2 wheren at least one of said lower alkyl acrylate esters is ethyl acrylate.

4. A curable composition as in claim 2 wherein at least one of said lower alkyl acrylate esters is butyl acrylate.

5. A curable composition as in claim 2 wherein at least one of said olefin-epoxide monomers is allyl glycidyl ether.

6. A curable composition as in claim 2 wherein at least one of said olefin-epoxide monomers is glycidyl acrylate.

7. A curable composition as in claim 2 wherein said salt is ammonium benzoate.

8. A curable composition as in claim 2 wherein said salt is ammonium acetate.

9. A curable composition as in claim 2 wherein said salt is ammonium formate.

10. A curable composition as in claim 2 wherein said salt is ammonium citrate.

11. A curable composition as in claim 2 wherein said salt is ammonium tartrate.

12. A curable composition which is curable in the presence of a heat treatment comprising an intimate admixture of at least one rubbery interpolymer and about 1 to 10 parts by weight of at least one heat decomposable ammonium salt of an organic acid per 100 parts by weight of said interpolymer, said interpolymer being formed from a polymerizable monomer charge comprising about 60 to 99.5 weight percent of at least one acrylate ester selected from the group consisting of ethyl acrylate and butyl acrylate, up to about 30 weight percent of acrylonitrile, about 0.5 to 10 weight percent of at least one olefin-epoxide monomer selected from the group consisting of allyl glycidyl ether and glycidyl acrylate and up to about 1.5 weight percent of allyl methacrylate and said ammonium salt being selected from the group consisting of the ammonium salts of formic, citric, oxalic, tartaric, benzoic and acetic acids.

13. The cured composition of claim 1.

14. The process for vulcanizing an interpolymer which comprises:
 (a) admixing said interpolymer with at least 1% by weight thereof of at least one heat decomposable ammonium salt of an organic acid to form a composition which is curable in the presence of heat, said acid being selected from the group consisting of formic, citric, oxalic, tartaric, benzoic and acetic acids, and
 (b) heating said composition to a temperature between 250° F. and 450° F. to effect said vulcanizing, said interpolymer being formed from a polymerizable monomer charge comprising about 60 to 99.5 weight percent of at least one lower alkyl acrylate ester, up to about 30 weight percent of acrylonitrile, about 0.5 to 10 weight percent of at least one olefin-epoxide monomer which contains in its structure at least one polymerizable carbon-to-carbon double bond and at least one epoxide radical and up to about 1.5 weight percent of at least one polyene monomer which contains in its structure at least two non-conjugated carbon-to-carbon double bond groups selected from the group consisting of vinyl and allylic groups.

15. The process of claim 14 in which said salt is ammonium benzoate.

16. The process of claim 14 in which said salt is ammonium acetate.

17. The process of claim 14 in which said salt is ammonium formate.

18. The process of claim 14 in which said salt is ammonium citrate.

19. The process of claim 14 in which said salt is ammonium tartrate.

20. The process of claim 14 wherein about 1 to 10% by weight of said ammonium salt is used based on the weight of said interpolymer and said monomer charge comprises about 60 to 99.5 weight percent of ethyl acrylate, up to about 30 weight percent of acrylonitrile, about 0.5 to 10 weight percent at least one of said olefin-epoxide monomers and up to about 1.5 weight percent of at least one of said polyene monomers.

21. The process of claim 14 wherein about 1 to 10% by weight of said ammonium salt is used based on the weight of said interpolymer and said monomer charge comprises about 60 to 99.5 weight percent of butyl acrylate, up to about 30 weight percent of acrylonitrile, about 0.5 to 10 weight percent of at least one of said olefin-epoxide monomers and up to about 1.5 weight percent of at least one of said polyene monomers.

22. A process for vulcanizing interpolymers wherein said interpolymers are formed from polymerizable monomer charges comprising about 60 to 99.5 weight percent of at least one acrylate ester selected from the group consisting of ethyl acrylate and butyl acrylate, up to about 30 weight percent of acrylonitrile, about 0.5 to 10 weight percent of at least one olefin-epoxide monomer selected from the group consisting of allyl glycidyl ether and glycidyl acrylate and up to about 1.5 weight percent of allyl methacrylate which comprises
 (a) admixing at least one of said interpolymers with about 1 to 10% by weight thereof of at least one ammonium salt of an organic acid selected from the group consisting of the ammonium salts of formic, oxalic, tartaric, benzoic and acetic acids to form a curable crude rubber composition and
 (b) heating said crude rubber composition to a temperature between 250° F. and 450° F. to effect said vulcanizing.

References Cited

UNITED STATES PATENTS

| | | | |
|---|---|---|---|
| 2,580,901 | 1/1952 | Erickson et al. | 260—86.1 |
| 2,600,414 | 6/1952 | Mast et al. | 260—86.1 |
| 2,729,625 | 1/1956 | Hurwitz | 260—80.5 |
| 2,787,561 | 4/1957 | Sanders | 260—80.5 |

OTHER REFERENCES

Kuzminskii et al., Chem. Abs. 54, page 1037i (1960).

JOSEPH L. SCHOFER, *Primary Examiner.*

DONALD E. CZAJA, *Examiner.*

H. WONG, *Assistant Examiner.*

UNITED STATES PATENT OFFICE

CERTIFICATE OF CORRECTION

Patent No. 3,335,118                                August 8, 1967

Gaylord A. Kanavel et al.

It is hereby certified that error appears in the above numbered patent requiring correction and that the said Letters Patent should read as corrected below.

Column 3, line 35, for "represents" read -- presents --; column 6, line 40, strike out "not"; column 8, line 26, for "glycidyl," read -- glycidyl --; line 49, after "which" insert -- is --; line 62, after "least" insert -- one --; column 10, line 38, after "formic," insert -- citric,--.

Signed and sealed this 16th day of July 1968.

(SEAL)
Attest:

Edward M. Fletcher, Jr.                                    EDWARD J. BRENNER
Attesting Officer                                              Commissioner of Patents